United States Patent [19]

Guillon

[11] Patent Number: 5,592,639
[45] Date of Patent: Jan. 7, 1997

[54] DEVICE AND METHOD FOR WRITING IN A STORAGE DEVICE OF THE QUEUE TYPE

[75] Inventor: Jean-Claude Guillon, Gerstheim, France

[73] Assignee: Laboratoire Europeen de Recherches Electroniques Avancees Societe en nom Collectif, Courbevoie, France

[21] Appl. No.: 176,675

[22] Filed: Jan. 3, 1994

Related U.S. Application Data

[63] Continuation of Ser. No. 613,630, filed as PCT/FR90/00230, Apr. 3, 1990, abandoned.

[30] Foreign Application Priority Data

Apr. 4, 1989 [FR] France ................................. 89 04405

[51] Int. Cl.[6] ................................................. G06F 12/02
[52] U.S. Cl. .................... 395/428; 395/494; 395/421.08; 395/421.09
[58] Field of Search ............................ 364/200 MS File, 364/900 MS File; 395/400, 425, 427, 428, 481, 421.09, 550, 494, 421.08

[56] References Cited

U.S. PATENT DOCUMENTS

| | | | |
|---|---|---|---|
| 4,603,384 | 7/1986 | Brantingham et al. .................. | 395/425 |
| 4,623,920 | 11/1986 | Dufresne et al. ........................ | 358/122 |
| 4,771,458 | 9/1988 | Citta et al. .................................. | 380/20 |
| 4,807,023 | 2/1989 | Bestler et al. ............................. | 358/86 |
| 4,835,738 | 5/1989 | Niehaus et al. ........................... | 395/425 |
| 4,974,225 | 11/1990 | Chenier et al. ........................ | 370/105.1 |
| 5,022,090 | 6/1991 | Masaki et al. ............................. | 382/49 |
| 5,109,501 | 4/1992 | Kaneko et al. ........................... | 395/425 |
| 5,121,480 | 6/1992 | Bonke et al. ............................. | 395/250 |

FOREIGN PATENT DOCUMENTS 0260886   3/1988   European Pat. Off. .

OTHER PUBLICATIONS

Electronic Engineering; vol. 43, No. 520, Jun. 1971, M. E. Hoff: "Using standard-length shift registers in custom-length applications", p. 61.
W. N. Carr et al.: "MOS/LSI design and application", 1972, McGraw-Hill M/A, (New York, US), pp. 176–178.

Primary Examiner—Eddie P. Chan
Assistant Examiner—Hiep T. Nguyen
Attorney, Agent, or Firm—Oblon, Spivak, McClelland, Maier & Neustadt, P.C.

[57]  ABSTRACT

The invention principally relates to a device and to a method for writing in a storage device of the stack type. The invention relates to the use of stacks (1) of the first-in, first-out (FIFO) type for the unscrambling of television images. In order to be able to write in such a stack (1) starting from a desired address, the procedure begins with writing non-pertinent information in order to increment the stack's internal counter to which there is no access. Then, starting from the desired value of the counter, pertinent information is written. It is possible to rewrite pertinent information over the non-pertinent information placed for example at the start of the stack. The present invention applies in particular to the use of special memories for uses which have not been foreseen by the manufacturer. It applies more particularly to the use of stacks (1) of the first-in, first-out type for the unscrambling of television images.

9 Claims, 2 Drawing Sheets

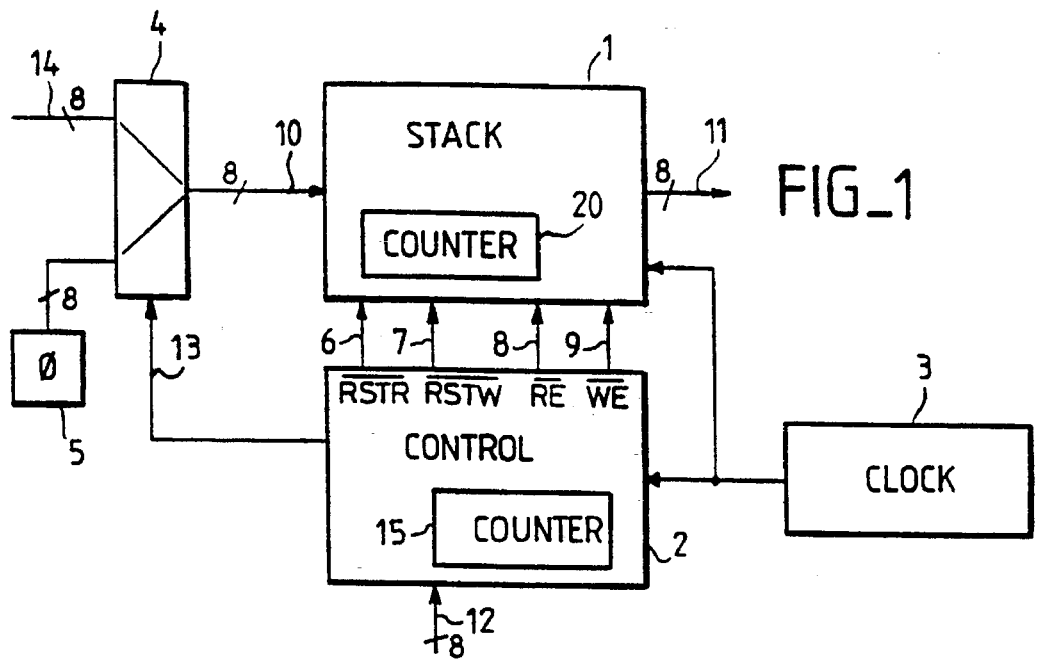
FIG_1
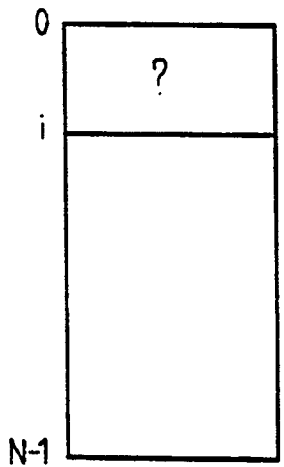
FIG_2 a
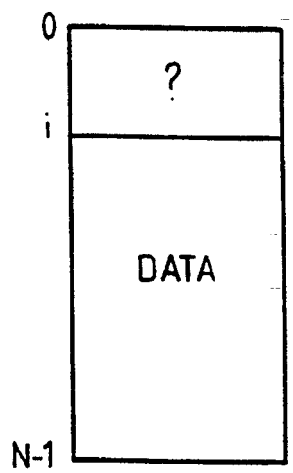
FIG_2 b
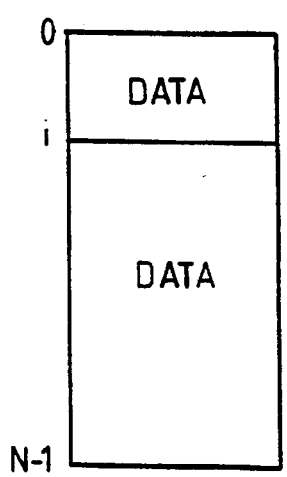
FIG_2 c

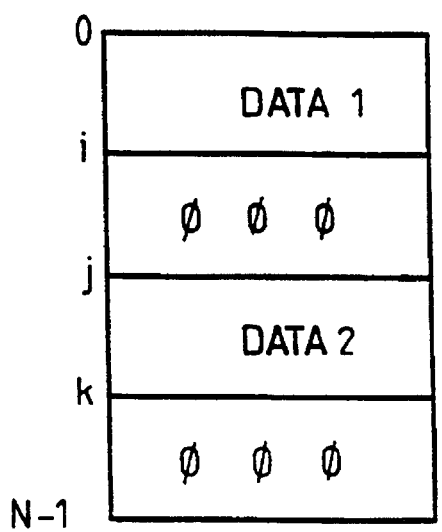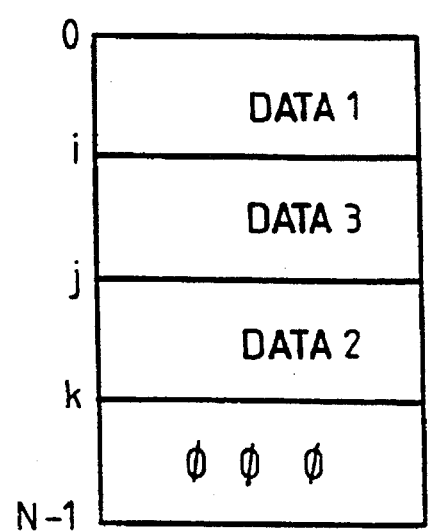

DEVICE AND METHOD FOR WRITING IN A STORAGE DEVICE OF THE QUEUE TYPE

This application is a Continuation of application Ser. No. 07/613,630, filed Nov. 28, 1990, abandoned, which was filed as International Application No. PCT/FR90/00230, Apr. 3, 1990.

SUMMARY OF THE INVENTION

Field of the Invention

The invention principally relates to a device and to a method for writing in a storage device of the queue type.

The evolution of technology makes available to the engineer, for the design of his circuits, an increasing number of types of storage devices. Certain of these very specialized storage devices allow the simplification of the design of electronic devices. However, their use outside of the use foreseen by the manufacturer can prove very difficult or even impossible.

For example, general purpose random access memories (RAM) have a very extended possibility of use but require an addressing circuit capable of generating the address to which it is desired to write information.

On the contrary, queue type memories like for example queues of the "first-in, first-out" (FIFO) type do not require any addressing circuit. On the contrary, the user does not have access to the read/write address bus. For example, in the 1135×8 bits memory of the first-in, first-out type marketed with the reference number μPD 41102 by NEC CORPORATION, only four control signals are available:

RSTR: initialization of the read counter (Reset Read);
RSTW; initialization the write counter (Reset Write);
RE: Read control signal (Read enable);
WE; write control signal (Write enable).

An object of the present invention is the use of memories of the queue or shift register type with the possibility of writing starting from a desired address. In order to do this, a writing of non-pertinent information is carried out in order to bring the counter to the desired value. Starting from this moment, the pertinent information which it is desired to store in this memory is written. If it appears necessary or useful, pertinent information is written over the non-pertinent information which allowed the counter to be brought to the desired write address. Non-pertinent information is understood to be information whose reading is not necessary for the procedure being used.

Another object of the present invention is a control device for a storage device, this control device comprising an address counter and a non-accessible address bus characterized in that it comprises means allowing the address counter to be advanced up to a desired value by carrying out writing of non-pertinent data in the storage device (1).

Another object of the invention is a device characterised in that it comprises at least one counter and one logic gate.

Yet another object of the invention is a device characterized in that it comprises a generator of non-pertinent data.

Another object of the invention is a device for unscrambling television transmissions characterized in that it comprises two queues of the first-in, first-out (FIFO) type and a control device.

Another object of the invention is a method for writing in a storage device comprising an address counter, the method comprising the steps:

initialization of the address counter;
writing of non-pertinent data until the desired value of the address counter is obtained;
writing of pertinent data.

Another object of the invention is a method characterised in that the non-pertinent data is data that is present on a data bus at the moment of writing non-pertinant data.

Another object of the invention is a method characterised in that the non-pertinent data are generated by a device for generating non-pertinent data.

Another object of the invention is a method characterized in that the non-pertinent data are words composed of 0's.

Another object of the invention is a method characterised in that it comprises, after the step of writing non-pertinent data, a step of writing pertinent information to the addresses of the non-pertinent data.

Another object of the invention is a method characterised in that the pertinent data are digitized video signals corresponding to a line to be displayed.

Another object of the invention is a method for unscrambling pay television transmissions characterized in that it uses a writing method.

The present invention will be better understood by means of the following description and of the appended figures given as non-limitative examples and in which:

BRIEF DESCRIPTION OF THE DRAWINGS

FIG. 1 is a diagram of an embodiment of the device according to the present invention;

FIGS. 2a–2c are diagrams of a first functional mode of the device according to the present invention;

FIGS. 3a and 3b are diagrams diagram of a second functional mode of the device according to the present invention.

DETAILED DESCRIPTION OF THE DRAWINGS

In FIG. 1, there can be seen a queue 1, advantageously of the first-in, first-out type, connected to a control device 2. The queue 1 is connected on input to a data bus 10, for example an 8-bit bus. The queue 1 is connected on output to a data bus 11, for example an 8-bit bus. The control device 2 supplies to the queue 1 a control signal 6 RSTR, a control signal 7 RSTW, a control signal 8 RE and a control signal 9 WE. Advantageously, the queue 1 and the control device 2 are connected to a same clock 3. The control device 2 receives, via an address bus 12 whose width depends on the capacity of the stack 1, the address to which or, advantageously, starting from which it is desired to write an information in the queue 1. In order to bring the stack 1 to the desired address after an initialization signal of the write counter RSTW, the control device 2 enables, via a signal WE, the writing in the queue 1 of any information and it enables this until the internal counter of the queue 1 is brought to the desired value.

In a first embodiment of the device according to the present invention the control device 2 enables the writing in the queue 1 of the information present on the data bus 10 whatever they may be. Any information can be for example a signal digitised before the instant at which the pertinent signal will be present on the bus 10. For example, if it is desired to store, in the queue 1, a video signal corresponding to a line to be displayed, the non-pertinent information stored can be a section of a digitized video information relating to the preceding line of the image.

In a second embodiment of the device according to the present invention the device comprises a generator 5 of non-pertinent information. The generator 5 is for example a generator of words composed solely of 1's, solely of 0's or a pseudo-random generator. A generator of 0's or of 1's can be produced simply by connecting wires to electrical voltages corresponding to the desired logic 0 or 1 level.

Advantageously, the generator 5 of non-pertinent information is connected to the data bus 10 via a multiplexer 4. The multiplexer 4 can for example be controlled by the line 13 connected to the control device 2 which, depending on the value of the counter of the queue 1, connects either the external data bus 14 or the device 5 to the data bus 10.

Precisely insofar as the counter of the queue 1 is not accessible, the control device 2 advantageously comprises a counter 15 operating in a way similar to that of the queue 1 in order to know at any time the current value of the counter of the queue 1. Furthermore, the control device comprises a logic circuit allowing the zero resetting of the counter 15 and the desired activation of the signals 6, 7, 8 and/or 9.

In FIGS. 2a–2c there can be seen an example of the functioning of the device according to the present invention. In a queue, the capacities N of the addresses are included between 0 and N–1. If, for example, it is desired to write certain data starting from the address i, which is between 0 and N–1, a preparation phase is carried out first as illustrated in FIG. 2a. During the preparation phase, non-pertinent information is written between the address 0 and the address i. Starting from this moment, a first pertinent phase, as illustrated in FIG. 2b, is started; pertinent data are written, as desired, starting from the value i and for example up to the address value N–1. This phase can be completed by the phase, illustrated in FIG. 2c, of writing pertinent data between the address 0 and i, these values erasing the non-pertinent data written during the preparation phase illustrated in FIG. 2a.

The method illustrated in FIGS. 2a–2c serves, for example, for the unscrambling of television signals. In such a device, the active part of the video signal of a line has been inverted about a cut-off point. The procedure begins by writing the video signal starting from the address corresponding to the cut-off point. The address of the cut-off point corresponds to the address i in FIGS. 2a–2c. In order to do this, it is therefore necessary to bring the internal counter of the queue 1 in FIG. 1 to the address i. This is carried out for example by storing the video signal present on the bus 10 before the active part of the video line which is of interest begins. For example, a part of the video signal corresponding to the previous line is stored. Once the part of the video signal has been written between the address i and the address N–1, it is possible to carry out the writing between the address 0 and the address i of the part of the video signal which has been permuted. Insofar as during the scrambling of the transmission, a first circular permutation of two segments of the active part of the video signal of a line was carried out, and that during the writing of the queue 1 in FIG. 1 a second circular permutation was carried out, an unscrambled image line is obtained in the queue 1.

In FIGS. 3a–3b there can be seen a second example of a functional mode of the present invention. If, for example, it is desired to write a first data packet between the address 0 and i, a second data packet between the address j and k and a third data packet between the address i and J, 0<i<J<k<N–1, and if the third data packet is available after the second data packet, it is possible to write the first data packet between the address 0 and i. Non-pertinent information is then written between i and J. In the example shown in FIG. 3, words composed solely of 0's have been written. Then, the data of the second packet are written between the address J and k. The counter of the queue 1 is reset to 0 by writing, for example, words composed of 0's between the address k and the address N–1. The end of this step is shown in FIG. 3b. It is performed either by rewriting the data packet 1 between 0 and 1 or, if the type of memory allows this, by carrying out a readout of data between 0 and i in order to advance the counter of the stack to the value i. At that moment, the third data packet is written between the address i and the address J. The words composed of 0's are left between the address k and the address N–1. These words composed of 0's may not be at all harmful in the sequence of exploitation of the information stored in the queue 1. The rewriting of the data 1 between the address 0 and the address i can be carried out either by the connection of the output to the input of the storage device 1 or by generating this information externally a second time.

The present invention applies in particular to the use of special memories for uses which have not been foreseen by the manufacturer.

It applies more particularly to the use of queues of the first-in, first-out type for the unscrambling of television images.

I claim:

1. A method for writing data into a given address of a first-in, first-out (FIFO) memory storage device under control of a control device, wherein the FIFO memory storage device comprises a FIFO counter, which can be reset and incremented by the control device, but wherein the FIFO counter cannot be read from the control device and the FIFO counter cannot be written by the control device, said method comprising the steps of:

specifying a given multi-bit memory address to which pertinent data is to be written by applying the given multi-bit memory address on a multi-bit address bus of the control device;

synchronizing a multi-bit address counter in the control device with the FIFO counter so that the multi-bit address counter and the FIFO counter are both reset to zero after the given multi-bit memory address is applied to the multi-bit address bus;

repetitively writing non-pertinent data into said FIFO memory storage device until the given multi-bit memory address is stored in the FIFO counter, wherein said multi-bit address counter and said FIFO counter are incremented each time a write operation is performed to said FIFO memory;

writing pertinent data into said FIFO memory storage device when the given multi-bit memory address is stored in the FIFO counter.

2. A method as in claim 1, further comprising the step of:

generating non-pertinent data.

3. A method as in claim 2, further comprising the step of:

writing, after completing the step of writing pertinent data into said FIFO memory storage device when the given multi-bit memory address is stored in the FIFO counter, pertinent data into a location in the FIFO memory storage device which has had non-pertinent data written therein.

4. A method as in claims 1, 2 or 3 wherein pertinent data is formed by:

a digitized line of a video signal.

5. A method as in claim 4, further comprising:

unscrambling said video signal written into said FIFO memory storage device.

6. A control apparatus for controlling a first-in, first-out (FIFO) memory storage device, the FIFO memory device having a FIFO counter, plural data inputs, a write enable input, a read enable input, a read-reset input and a write-reset input, wherein the FIFO counter can be reset and incremented by the control device, but wherein the FIFO counter cannot be read from the control device and the FIFO counter cannot be written by the control device, the control apparatus comprising:

a multi-bit counter containing a multi-bit counter value;

a multi-bit address bus for receiving a multi-bit memory address to which pertinent data is to be written in a FIFO memory device;

means for generating a write-reset signal to be applied to the write-reset input of the FIFO memory device when the multi-bit memory address is received by the multi-bit address bus;

means for synchronizing the multi-bit address counter in the control device with the FIFO counter so that the multi-bit address counter and the FIFO counter are both reset to zero after the multi-bit memory address is received by the multi-bit address bus;

means for incrementing the multi-bit counter value each time the control apparatus writes to the FIFO memory device;

means for writing non-pertinent data to the FIFO memory device by repetitively applying a write signal to the write-enable input of the FIFO memory device and by applying non-pertinent data to the FIFO memory until the multi-bit counter contains a multi-bit counter value equal to the multi-bit memory address applied on the multi-bit address bus; and means for writing pertinent data to the FIFO memory device by applying said pertinent data to said plural data inputs and by applying a write signal to the write-enable input of the FIFO memory device when the multi-bit counter contains a multi-bit counter value equal to the multi-bit memory address applied on the multi-bit address bus.

7. The control apparatus of claim 6, further comprising:

a data bus;

a source of non-pertinent data;

a multiplexer for receiving multiplexed data from one of the data bus and the source of non-pertinent data and for applying the multiplexed data to the plural data inputs of the FIFO memory device.

8. The control apparatus of claim 7, wherein the source of non-pertinent data comprises a source for generating zero values.

9. A control device as in claim 6, further comprising:

means, coupled to said means for writing non-pertinent data, for generating non-pertinent data.

* * * * *